July 31, 1923.  1,463,195
E. BREITLING ET AL
CASH REGISTER
Filed May 13, 1922  3 Sheets-Sheet 1
Fig. 2.  Fig. 1.
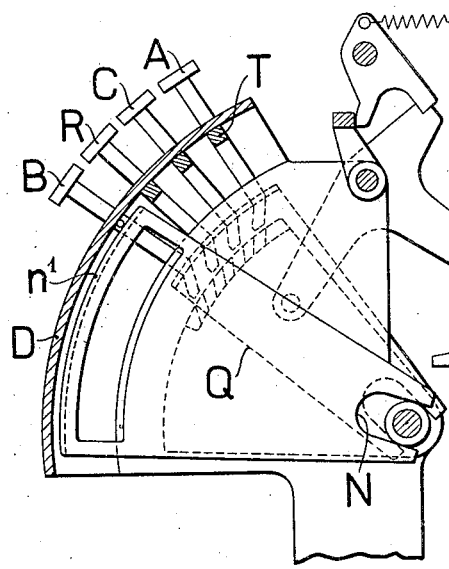
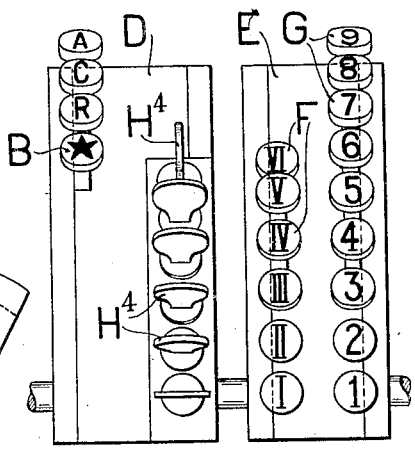
Fig. 3.
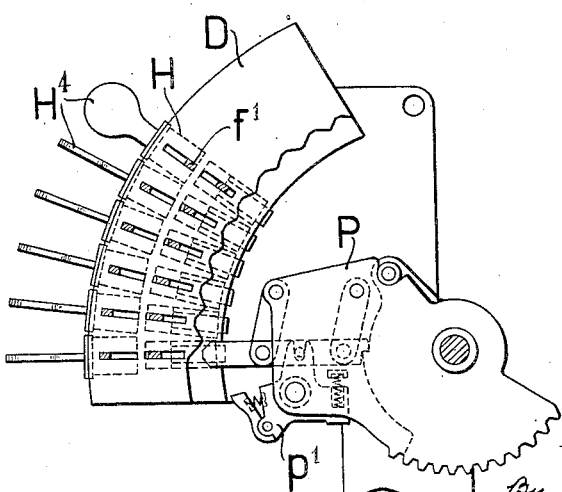

July 31, 1923.

E. BREITLING ET AL

CASH REGISTER

Filed May 13, 1922

E. BREITLING ET AL

CASH REGISTER

Filed May 13, 1922   3 Sheets-Sheet 3

Patented July 31, 1923.

1,463,195

UNITED STATES PATENT OFFICE.

ERNST BREITLING AND EDUARD OSTMEYER, OF ESSEN, GERMANY, ASSIGNORS TO FRIED. KRUPP AKTIENGESELLSCHAFT, OF ESSEN-ON-THE-RUHR, GERMANY.

CASH REGISTER.

Application filed May 13, 1922. Serial No. 560,603.

*To all whom it may concern:*

Be it known that we, ERNST BREITLING, residing at Essen, Germany, and EDUARD OSTMEYER, residing at Essen, Germany, both citizens of the Republic of Germany, have invented a certain new and useful Improvement in Cash Registers, of which the following is a specification.

This invention relates to cash registers of the kind comprising a plurality of groups of setting members, such as f. i. keys for setting the mark indicating the line of business and keys for setting the seller's mark.

The invention has for its object to provide a cash register of the kind stated in which the setting mechanism is of a construction such as to cause the depressing of a key of one group (f. i. the cash sale key) to enlarge the action of a likewise depressed key of the other group (seller's key). Therefore, in the succeeding operation of the cash register, not only the seller's mark will be set and the corresponding drawer-lock released, but the corresponding seller's totalizing counter will be thrown in too, while the seller's totalizing counter will remain thrown out if the cash sale key has not been depressed.

The accompanying drawing illustrates, by way of example, an embodiment of the subject-matter of the invention.

Fig. 1 is a front elevation of the key arrangement of a cash register and of the locks locking the sellers' keys;

Figs. 2, 3 and 4 show each a side elevation, partly in section of the bank of the line-of-business keys, the locks and the bank of the sellers' keys;

Figure 4:
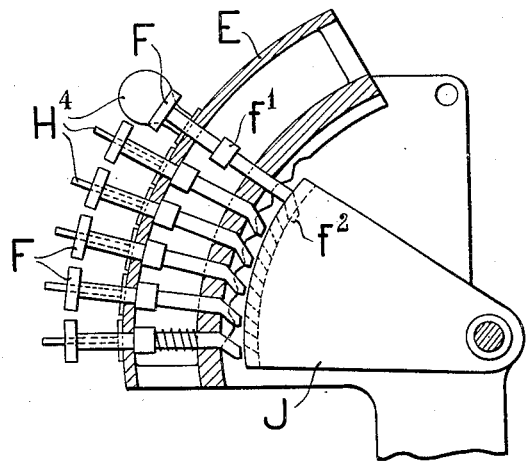
Figure 5:
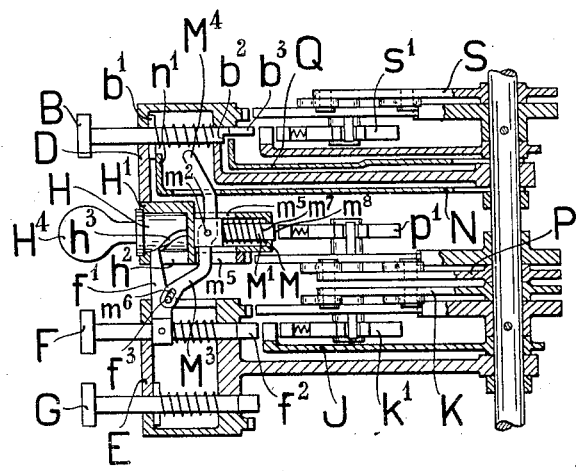
Fig. 5 is a horizontal section through the key-banks with cash sale key, seller's key with lock and amount key.
Figure 6:
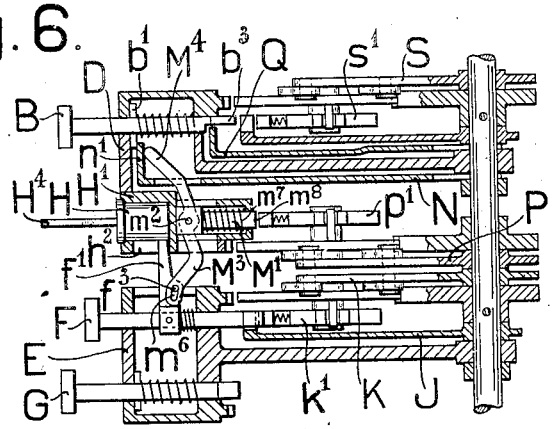
Figs. 6 and 7 are views corresponding to Fig. 5, the parts being in another position.
Figure 7:
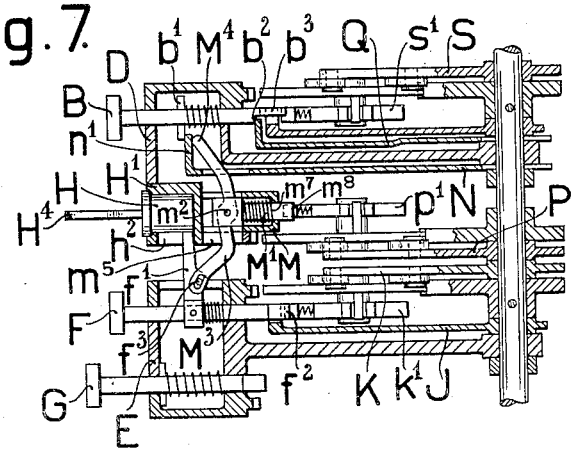

Referring now to the drawing, D designates the key-bank in which the special-business keys A, C, R for "expense", "credit", "account" as well as the cash sale key B are arranged, and E is the key-bank in which the sellers' keys F and the amount keys G are arranged. Each seller's key F is in positive connection with a nut H (Figs. 3, 5 to 7) of a safety lock arranged laterally of the key in the key-bank D. To this end, the key F has rigidly connected to it an arm $f^1$ standing vertical with relation to the key and projecting through a slot $h^2$ of the lock housing $H^1$, the free end of the arm engaging a helical groove $h^3$ (Fig. 5) of the nut H. Owing to this arrangement, the nut H will be rotated upon depressing the key F. However, inasmuch as the nut is, in a well-known manner, held against rotation by tumblers when the key $H^4$ is withdrawn, which tumblers are being lifted when the key $H^4$ is inserted, the key F can only be depressed after the insertion of the key $H^4$ into the lock. The depressed seller's key F is held by a key-locking rocker J. The toe $f^2$ of the depressed key F serves as stop for a feeler $k^1$ of a setting disk K and limits the movement of this disk in the operation of the cash register. The setting disk K causes the setting of the seller's mark in the display and printing mechanism and the release of the drawer-lock.

Arranged in prolongation of the lock housing $H^1$ is a sleeve M in which a shiftable member $M^1$ is guided. Pivoted to the shiftable member by means of a pin $m^2$ is a double-armed lever $M^3$ $M^4$, the arms of which extend outwardly through slots $m^5$ of the sleeve M. The lever arm $M^3$ is provided with an oblong slot $m^6$ which is engaged by a pin $f^3$ fastened to the key arm $f^1$. The lever arm $M^4$ is designed to co-operate with the bent edge $n^1$ of a slide N in a manner to be hereinafter described. The shiftable member $M^1$ is adapted to be moved by the intermediary of the double-armed lever $M^3$ $M^4$ contrary to the action of a helical spring $m^7$ in a manner such as to cause the end $m^8$ of the shiftable member, which projects through the bottom of the sleeve M, to take a position in the path of a feeler $p^1$ of a setting disk P and to limit the movement of this setting disk in the operation of the cash register, so that a seller's totalizing counter will be thrown in. As will be hereinafter described, the setting disk P does not only act on the seller's totalizing counters but is also adapted to act on the three additional totalizing counters for the special lines of business such as "expense", "credit", "account" etc.

Figure 8:
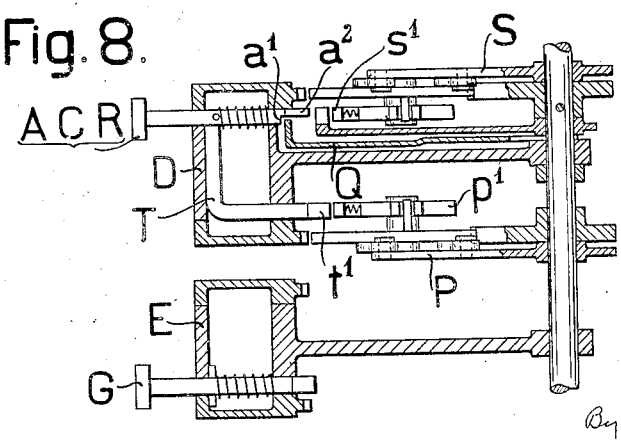
Fig. 8 is a horizontal section of the key-banks with a key for special business and an amount key.

On depressing the cash sale key B, same will carry along with it, by means of a pin $b^1$ fastened to the key, the slide N and, by means of an offset $b^2$, another slide Q which serves to release the operating mechanism of the machine and institute the proper operation of the cash register. Besides the key toe $b^3$ will come into the path of a feeler $s^1$ of a setting disk S which causes the setting of the mark for the line of business in the display and printing mechanism. The special keys A, C, R, arranged above the cash sale key B, are adapted to act on the slide Q and the setting disk S but not on the slide N. Each of the special keys A, C, R has rigidly connected to it an angularly bent arm T which has a portion extending parallelly to the key-shaft and lying in a vertical plane above the shiftable members $M^1$. If one of the special keys A, C, R is depressed, the end $t^1$ of the key arm T will form a stop for the feeler $p^1$ of the setting disk P which has been oscillated during the operation of the cash register and which is thereby adjusted in such a manner that it will throw in the additional totalizing counter for the respective special business. Moreover, the slide Q is carried along by the offset $a^1$ (Fig. 8) of the key-shaft, and the key-toe $a^2$ is being moved into the path of the setting disk S.

The operation of the described arrangement is as follows:

In order to prepare an operation of the cash register, after a seller's key F has been released by the insertion of the key $H^4$ into the corresponding lock, the amount keys G are first depressed, thereafter the released seller's key F and at last one of the keys B, A, C, R for the lines of business. In the succeeding operation of the cash register, the setting of the seller's mark in the display and printing mechanism and the release of the lock of the corresponding seller's drawer will be controlled by the depressed seller's key F. The depressing of the seller's key F will further cause the double-armed lever $M^3$ $M^4$ to be oscillated around the axis of the pin $m^2$ (Fig. 6) and the lever arm $M^4$ to be moved into the path of the edge $n^1$ of the slide N which is acted upon by the cash sale key B.

If, now, a cash sale should be registered, the key B will be depressed and the lever $M^3$ $M^4$ oscillated around the axis of the pin $f^3$ (Fig. 7) by the intermediary of the slide N which is carried along by the pin $b^1$ of the key B and the edge $n^1$ of which acts on the lever arm $M^4$. The shiftable member $M^1$ pivoted to the lever $M^3$ $M^4$ will thus be shifted contrary to the action of the spring $m^7$ in a manner such as to cause the end $m^8$ of the shiftable member $M^1$ to serve as stop for the feeler $p^1$ of the setting disk P by means of which the seller's totalizing counter corresponding to the depressed seller's key F is thrown in upon the following operation of the cash register. Besides, the slide Q is carried along by the offset $b^2$ of the key B and, thereby, the operation of the cash register caused, and upon this operation of the cash register, the setting disk S is stopped by the toe $b^3$ of the key B in a position such as to cause the cash sale mark to appear in the display and printing mechanism.

In operations of the cash register without cash receipt in which one of the special keys A, C, R has to be depressed instead of the cash sale key B, the seller's totalizing counter of the likewise depressed seller's key F will remain thrown out, since these special keys will act on the slide Q but not on the slide N and, accordingly, also not on the lever $M^3$ $M^4$ and the shiftable member $M^1$. In this case, the registration of the set amount will take place in the totalizing counter for "expense", "credit" or "account" according to the depressed special key, the end of the key arm T moved along upon depressing a special key serving as stop for the feeler $p^1$ of the setting disk P by which, in this case, the throwing-in of a special-business totalizing counter is mediated.

As the cash sale key B and the special business keys A, C, R are depressed last in preparing an operation of the cash register, same may also be used as motor keys, the operating mechanism of the machine being released as well as the motor coupled, in a manner known per se, and the driving circuit closed by the intermediary of the slide Q moved upon depressing these keys. In multiple-counter cash registers such as described, it is therefore possible to maintain the succession of key-settings as used in single-counter cash registers.

Claims:

1. A cash register comprising a plurality of groups of setting members and an operating mechanism, a member in the operating mechanism mounted for oscillatory setting movement, a shiftable member adapted to be moved into and out of the path of the said oscillatory member and to form a stop for the latter, the shiftable stop member being adapted to be moved into a position preparing its operative position with relation to the oscillatory member by actuating a member of one of the groups of setting members and allowed to be moved into its final operative position by actuating a member of another of the groups of setting members, the stop member when in its operative position being adapted to limit the setting movement of the oscillatory member of the operating mechanism.

2. A cash register comprising a group of depressible keys for setting the mark of the line of business, another group of keys for setting the seller's mark and a cash register operating mechanism, an oscillatory disk in the operating mechanism for setting special totalizing counters, a shiftable stop member adapted to be moved into and out of the path of the oscillatory setting member, the shiftable stop member being adapted to be moved into a preparatory position by the depression of one of the keys for setting the seller's mark and allowed to be moved into its final operative position with relation to the oscillatory setting disk by the depression of one of the keys for setting the line-of-business mark.

3. A cash register comprising a group of depressible keys for setting the mark of the line of business, another group of keys for setting the seller's mark and a cash register operating mechanism, an oscillatory disk in the operating mechanism for setting special totalizing counters, a shiftable stop member adapted to be moved into and out of the path of the oscillatory setting member, a pin on the shiftable stop member, a double-armed lever pivotally mounted on the said pin, one arm of the lever being adapted to be acted upon by a key of the second group of keys so as to cause the lever to be swung around the axis of the said pivot pin upon the depression of said key, and the other arm of the lever to be brought into the path of a member of the cash register operating mechanism, which member is adapted to be adjusted by the depression of a key of the first group of keys.

The foregoing specification signed at Essen, Germany, this 19th day of April, 1922.

ERNST BREITLING.
EDUARD OSTMEYER.

In presence of—
JOHANN DECKERS,
CARL MÜLLER.